United States Patent Office 3,539,574
Patented Nov. 10, 1970

3,539,574
9-CARBOXYLIC ACID ESTERS OF N-ORGANO-SUBSTITUTED ACRIDINIUM COMPOUNDS
Desmond Sheehan, Hamden, Rose Ann Clarke, Bethel, and Michael McKay Rauhut, Norwalk, Conn., assignors to American Cyanamid Company, Stamford, Conn., a corporation of Maine
No Drawing. Continuation-in-part of application Ser. No. 637,091, May 9, 1967, which is a division of application Ser. No. 427,459, Jan. 22, 1965. This application Dec. 13, 1968, Ser. No. 783,755
Int. Cl. C07d 37/20
U.S. Cl. 260—279          4 Claims

ABSTRACT OF THE DISCLOSURE

Compounds which are 9-carboxylic acid esters on N-organo-substituted acridinium salts and method of making the compounds.

---

This application is a continuation-in-part of Ser. No. 637,091, filed May 9, 1967, and now abandoned, which was a division of Ser. No. 427,459, filed Jan. 22, 1965, now U.S. Pat. No. 3,352,791.

The present invention relates to novel compositions of matter and reactions for the direct generation of light from chemical energy. By "light," as referred to herein, is meant electromagnetic radiation at wavelengths falling between 350 mµ and 700 mµ. The art of generating light from chemical energy, i.e., chemiluminscence, is continually in research of compositions which when reacted substantially improve the intensity and lifetime of light emissions. Obviously, improved compositions are constantly in demand for use as signal devices, for area illumination, etc.

The present invention is concerned more particularly with a compound which has not only chemiluminescent properties but which has inherent fluorescent properties, thereby eliminating the necessity of the addition of a separate fluorescent compound.

It is an object of this invention to obtain a chemiluminescent composition and a process employing said composition whereby high efficiency may be obtained in the conversion of chemical energy into light.

Another object is to obtain a chemiluminescent compound which produces light over an extended period of time.

Another object of this invention is to obtain a chemiluminescent composition which obtains a light of substantially higher intensity than has been obtained by former chemiluminescent compositions.

Another object of this invention is to obtain a chemiluminescent composition which may be employed to obtain a process which is mechanically simple and which is economically inexpensive.

Another object of this invention is to obtain a chemiluminescent reactant which is stable over a long period of time and which may be subsequently reacted to obtain chemiluminescent light.

Another object of this invention is to obtain a chemiluminescent reactant which when reacted will obtain chemiluminescent light by a process which is not hazardous.

Another object of this invention is to obtain a chemiluminescent reactant which when employed in the presence of other fluorescent agents will emit light of a desired color (dependent upon wavelength).

Another object of this invention is to obtain a reaction composition which includes the chemiluminescent reactant of this invention, a peroxide compound and a diluent.

Another object of this invention is to obtain the reaction product of the chemiluminescent reactant of this invention when reacted with other necessary ingredients to produce chemiluminescent light.

The term "chemiluminescent reactant," as used herein, means a mixture which will result in a chemiluminescent reaction when reacted with other necessary reactants in the processes as disclosed herein.

The term "chemiluminescent composition," as used herein, means a mixture which produces chemiluminescence.

The term "admixing," as used herein, means "reacting" or sufficiently bringing together component reactants to obtain a chemiluminescent reaction.

The term "peroxide compound," as used herein, includes a typical peroxide and also includes compounds which upon reaction produce the peroxidic group.

The term "peroxidic group," as used herein, represents HOO—, WOO—, or

as defined in the following disclosure.

The term "hydrogen peroxide compound" includes (1) hydrogen peroxide and (2) hydrogen peroxide-producing compounds.

The term "diluent," as used herein, means a solvent or a vehicle which when employed with a solvent does not cause insolubility.

We have unexpectedly discovered that the objects of this invention are obtained by employing an acridine 9-carboxylic acid halide or anhydride, or salt of the halide or of the anhydride, which when admixed with a peroxide compound and with a diluent reacts to produce chemiluminescent light. Thus, the acridine compound, the peroxide compound, and the diluent are necessary reactants.

The acridine 9-carboxylic acid halide and the acridine 9-carboxylic acid anhydride of this invention are represented by the following typical formula:

Formula I

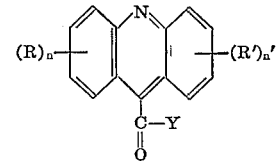

in which R and R' are each substituents selected from the group consisting of (1) halogen, (2) straight-chained, branched, and substituted alkyl, (3) aryl, aryl fused in the manner of benz-substituents, acyl, alkenyl, aroyl, dialkylamino, alkoxy, diarylamino, acylamino, arylsulfonylamino, aryloxy, alkylthio, arylthio, and arylthio in the substituted form; in which Y is (1) a halogen substituent such as fluorine, chlorine, bromine, and iodine, or (2) an anhydride-forming group of the typical formula —O—CO—R''', in which R''' is hydrogen, alkyl, aryl, acyl, or aroyl, and in which $n$ and $n'$ each represents any number less than 5.

Typical examples of the straight-chained or branched or substituted alkyl, referred to above, include methyl, ethyl, propyl, isopropyl, t-butyl, 2-methoxyethyl, 2-phenylpropyl, 3-chloropropyl groups and the like.

Typical examples of the aryl and substituted aryl include phenyl, 2,3-dimethoxyphenyl, 3,5-dimethoxyphenyl groups, and the like.

As noted above, each of the aryl, aryl fused in the manner of benz-substituents, acyl, alkenyl, etc., may be either in the substituted or unsubstituted form.

The salts of acridine-9-carboxylic acid halide or anhydride of this invention are typically represented by the following typical formula:

Formula II

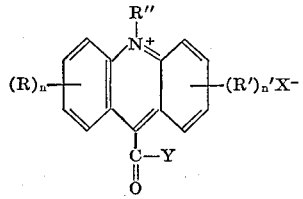

in which R, R', n, n', and Y are each defined according to Formula I above, in which R" is selected from the group consisting of hydrogen, alkyl, aryl, acyl, and aroyl substituents, and in which X⁻ is an anion such as fluoride, chloride, bromide, iodide, nitrate, sulfate, bisulfate, methosulfate, phosphate, chlorophosphate, tetrafluoroborate, hexachloroantimonate, tetraphenyl borate, perchlorate, formate, acetate, oxalate, sulfonate, alkyl sulfonate, aryl sulfonate, protic acid anion, and the like.

In an embodiment in which R" is hydrogen, the free acridine acid halide or anhydride (of Formula I) may be produced by treatment with a basic (alkaline) solution such as triethylamine in methylene chloride. Surprisingly, the free acridine acid halides are also chemiluminescent under the conditions described herein.

A second typical group of compounds of this invention formed by the reaction of the above compound referred to as Formula I when reacted with a peroxide is represented by the following typical formula:

Formula III

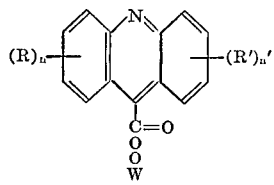

in which R, R', n and n' are each defined according to Formula II and in which W is selected from the group consisting of hydrogen, straight-chained or branched alkyl, cycloalkyl, acyl, aroyl, each in the substituted or unsubstituted form.

A third typical group of compounds of this invention formed by the reaction of the above compound referred to as Formula II, when reacted with a peroxide is represented by the following typical formula:

Formula IV

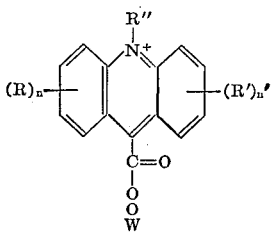

in which R, R', n, n', R" and X⁻ are each defined according to Formula II, and in which W is selected from the group consisting of hydrogen, straight-chained or branched alkyl, cycloalkyl, acyl, aroyl, each in the substituted or unsubstituted form.

Another group of compounds of this invention formed by further reaction of a peroxidic group-substituted acridine 9-carboxylic acid halide or anhydride, or salts thereof according to Formula III and IV with (1) a water-furnishing compound such as water or (2) a compound having a group readily replaced by water (to form a hydroxy group) such as alkoxy, alkylthio, alkylamino, alkylperoxy, arylperoxy, aroylperoxy, cyano, etc., is represented by the following formula:

Formula V

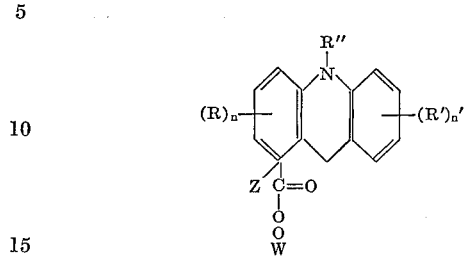

in which R, R', n, n', R" and W are each defined according to Formula IV, and in which Z is (1) a hydroxy group or (2) a group which upon reaction with water forms a hydroxy group such as alkoxy (i.e., methoxy, ethoxy, propoxy, decyloxy, hexyloxy, etc.), (3) aryloxy, acyloxy, aroyloxy, alkylamino, arylamino, alkylthio, arylthio, cyano, and a peroxidic group as defined above.

Typical acridine acid halides or anhydrides and their acid salts (A) A typical acridine 9-carboxylic acid halide or anhydride is represented by the typical formula:

Formula I

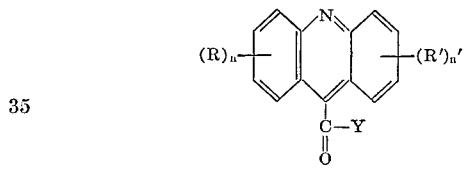

in which R, R', Y, n, and n' are defined according to Formula I above. Typical examples include, e.g.:

1,8-dimethyl-9-chlorocarbonylacridine
9-chlorocarbonylacridine
3,6-diethyl-9-chlorocarbonylacridine
3,6-dimethoxy-9-chlorocarbonylacridine
4,5-bis(dimethylamino)-9-chlorocarbonylacridine
2,6-diphenyl-9-chlorocarbonylacridine
14-chlorocarbonyl-dibenz[a.c]acridine
14-chlorocarbonyl-dibenz[a,h]acridine
9-fluorocarbonylacridine
9-bromocarbonylacridine
9-acetoxycarbonylacridine
9-benzoyloxycarbonylacridine
9-(1-naphthoyloxy)carbonylacridine
1,4,5,8-tetra-2-propyl-9-decoyloxycarbonylacridine
1,3,6,8-tetrakis(diphenylamino)-9(4-cyanobenzoyloxy)-carbonylacridine
bis-(acridine-9-carboxylic acid)anhydride and the like, together with the corresponding protic acid salts which may be generally represented by the formula:

Formula VI

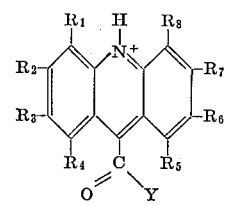

in which Y, and $R_1$ through $R_8$ are each defined according to R and R' of Formula I above and in which Y and X⁻ are each defined according to Formula II above, and (B) 9-halocarbonylacridine or acridine - 9 - acid anhydride and salts thereof, typical salts being:
(1) 9-chlorocarbonylacridine-hydrogen chloride salt.
(2) 9-chlorocarbonylacridinium hydrogen methosulfate.
(3) 9-chlorocarbonylacridinium hydrogen sulfate.
(4) 9-acetoxycarbonylacridinium hydrogen sulfate.
(5) 9-bromo-carbonylacridinium nitrate, and
(6) like salts derived from protic acids and 9-halocarbonylacridines and acridine acid anhydrides.

A limitation on the choice of substituents for R, R', R'', R''', X, Y, and Z is the requirement that each substituent be substantially inert to acid halides and not substantially quench fluorescence.

The N-substituted 9-halocarbonylacridinium salts and acridinium acid anhydrides are represented by the typical formula:

Formula VII

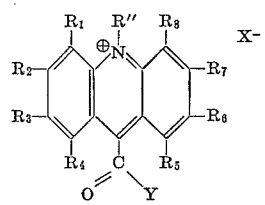

where Y is defined as in Formula I, and where $R_1$ through $R_8$ and $X^-$ may be groups as listed previously and where R'' may be straight-chain, branched or substituted alkyl, aryl, acyl or aroyl groups with the provisions listed previously.

Typical examples of the N-substituted 9-halocarbonylacridinium salts and corresponding anhydrides include:

9-chlorocarbonyl-N-methylacridinium chloride
9-chlorocarbonyl-N-methylacridinium bromide
9-chlorocarbonyl-N-methylacridinium nitrate
9-chlorocarbonyl-N-methylacridinium fluoroborate
9-bromocarbonyl-N-methylacridinium acetate
9-chlorocarbonyl-N-ethylacridinium acetate
9-chlorocarbonyl-N-ethylacridinium chloride
9-fluorocarbonyl-N-ethylacridinium nitrate
9-chlorocarbonyl-N-isopropylacridinium nitrate
9-bromocarbonyl-N-isopropylacridinium fluoroborate
9-chlorocarbonyl-N-phenylacridinium fluoroborate
9-bromocarbonyl-N-phenylacridinium bisulfate
9-bromocarbonyl-N-t-butylacridinium bisulfate
9-chlorocarbonyl-N-t-butylacridinium oxalate
9-chlorocarbonyl-N-acetylacridinium chlorosulfonate
9-chlorocarbonyl-N-benzoylacridinium dichlorophosphate
9-acetoxycarbonyl-N-methylacridinium chloride
9-benzoylcarbonyl-N-ethylacridinium nitrate
Bis(N-methylacridinium-9-carboxylic acid) anhydride dichloride salt and the like.

The acridine system may be substituted in positions 1 through 8 as described previously.

Of the 9-halocarbonylacridines, the protic acid salts thereof, and the N-substituted 9-halocarbonylacridinium salts, the preferred compounds and chemiluminescent compositions formed therefrom include:

(1) 9-chlorocarbonylacridine,
(2) 9-chlorocarbonylacridiniumhydrogen chloride,
(3) 9-chlorocarbonyl-N-methylacridinium chloride,
(4) 9-carboperoxyacridine
(5) 9-carboxylic peracid ester of acridine, and
(6) 9-arboxylic peracid ester of a N-organo-substituted acridinium salt.

The synthetic route

Among the acridine acid halides listed above, the only known recorded structure is 9-chlorocarbonylacridine hydrochloride.

Formula VIII

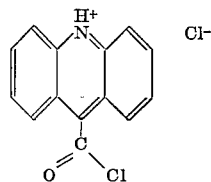

The compound was first "isolated" by Samdahl and Weider (Bull. Soc. Chim. [5], 2,2008 (1935)) as an intermediate for the preparation of corresponding esters in a study of bactericides. Nowhere is the compound suggested to be related to chemiluminescence. In consequence the methylated product of the derived ester and subsequent hydrolysis product, etc., are new compounds, i.e.:

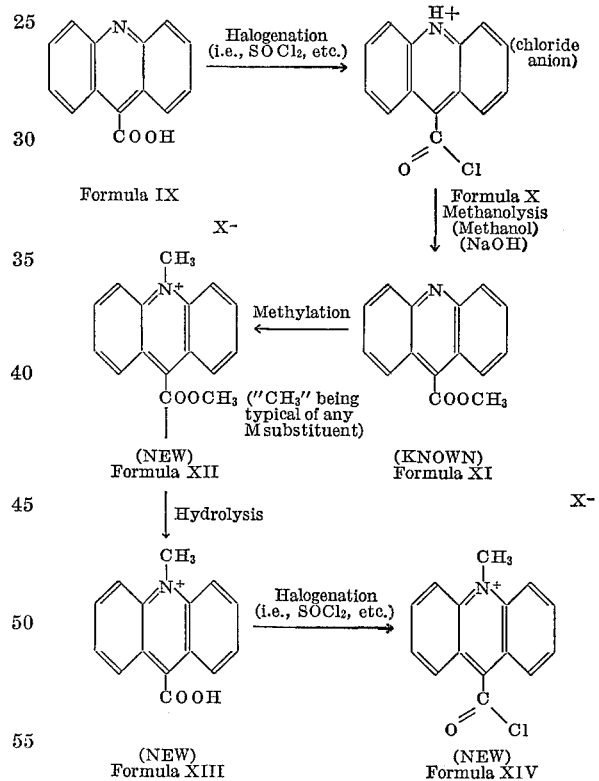

The free base acridine acid chloride is previously unknown.

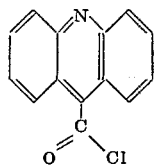

(NOVEL)
Formula XV

This compound was isolated; note that this is not a salt.

Synthesis of the above unknowns (1) 9 - carbomethoxy-N-methylacridinium methosulfate; No. XII above.—Six grams of 9-carbomethoxy acridine (Jensen and Rethwisch, J. Am. Chem. Soc. 50, 1144 (1928)) is heated in 25 ml. of dimethylsulfate on a steam bath for four hours. The product crystallinzes on cooling and filtration affords 7 g. of product (75% yield).

(2) 9 - carboxy-N-methylacridinium chloride; No. XIII above.—Twenty-one grams of product XII dissolved in 200 ml. of water is added to 200 ml. of 10% aqueous sodium hydroxide and the mixture is heated at about 70–100° C., to accelerate reaction, on a steam bath (for example) for four (about 3–5 hours) hours. The mixture is acidified with concentrated hydrochloric acid (or any other inorganic acid) to a pH below pH 7 and the product crystallizes preferably upon cooling. Filtration affords 13.3 g. of product (84% yield).

(3) 9-chlorocarbonyl - N - methylacridinium chloride; No. XIV above.—A mixture of 13.3 g. of product XIII and 100 ml. of thionyl chloride is heated under reflux for about 4–8 hours or until solution is complete. The addition of hot chloroform or other suitable solvent and cooling causes the product to crystallize; filtration affords 10.1 g. of product (71% yield).

The peroxide employed in the composition and processes of this invention may be obtained from any suitable peroxide compound. For example, the peroxide may be one or more of peroxides of sodium, potassium, cesium, rubidium, barium, etc. Alternatively sodium perborate may be placed in acqueous solution whereby a solution of hydrogen peroxide is obtained. Obviously hydrogen peroxide or its solution may be employed. Although the presence of water is necessary in order to obtain the preferred chemiluminescence of this invention, the peroxide employed may be obtained from anhydrous hydrogen peroxide compounds such as perhydrate of urea (urea peroxide), perhydrate of pyrophosphate (sodium pyrophosphate peroxide), perhydrate of histidine (histidine peroxide), and the like. Still another form in which the anhydrous $H_2O_2$ may be provided in the composition is that of an anhydrous solution of $H_2O_2$ in a suitable solvent, such as an ether, an ester, alcohol, ketone, etc., of the type which would provide a suitable diluent for the composition of this invention.

When the acridine 9-carboxylic acid halide or anhydride, or salts thereof, is reacted under alkaline (basic) conditions, at a pH above about pH 7, it has been unexpectedly found that particular organic peroxides which work include organic peroxide compounds such as perbenzoic acid, benzoyl peroxide, perlauric acid, and t-butyl hydroperoxide. However, di-t-butyl peroxide does not work in the anhydrous state, under alkaline reaction conditions. The organic peroxides do not produce chemiluminescence under non-alkaline conditions.

The peroxide concentration may range from about 1 to below about 100% and may de diluted before or after mixing other chemiluminescent reactants, though the latter is generally preferred. The acid halide compound of this invention may be added as a solid or in admixture with a suitable solid peroxide reactant or alternatively dissolved directly in a solution containing the peroxide reactant.

It is obvious of course, that water may be employed as the diluent. However, typical additional diluents which may be employed with the water or as the primary diluent within the purview of the instant discovery are those that do not readily react with a peroxide such as those discussed above, for example, hydrogen peroxide, and which do not readily react with the acid halide compound of this invention. In all cases, however, the diluent must include a compound furnishing a hydroxy group upon the admixing (reaction) with the peroxide and the chemiluminescent compound. Such typical compounds include water and alkali. However, also compounds which upon decomposition during the admixing stage produce water or an alkali are within the scope of the hydroxy-furnishing compound. Additionally, however, there are compounds discussed above which, having already reacted with a peroxide group, do not require additional reaction with a peroxide when reacting with the hydroxy group.

The additional diluents (solvents) which may be employed may be any diluent if it is non-reactive with the peroxide employed so long as the peroxide employed is at least partially soluble in the diluent, such as for example, at least one gram of $H_2O_2$ per liter of diluent. The following are illustrative examples of diluents or solvents which may be employed: non-cyclic or cyclic ethers, such as diethyl ether, diamyl ether, diphenyl ether, anisole, tetrahydrofuran, dioxane, and the like; esters, such as ethyl acetate, propyl formate, amyl acetate, dimethyl phthalate, diethyl phthalate, methyl benzoate, and the like; alcohols such as methanol, 2-propanol, cyclohexanol, glycerine; ketones such as acetone, acetophenone; amides such as dimethylformamide, N-methylpyrrolidinone, hexamethylphosphoramide and the like.

No separate fluorescent compound need be added. However, the fluorescent compounds contemplated herein for the purpose of shifting the spectral emission to longer wavelengths are numerous and they may be defined broadly as those which do not readily react on contact with the peroxide employed; likewise, they do not readily react on contact with the acid halide compound. Typical suitable fluorescent compounds for use in the present invention are those which have a spectral emission falling between 430 millimicrons and 700 millimicrons and which are at least partially soluble in any of the above diluents, if such diluent is employed. Among these are the conjugated polycyclic aromatic compounds having at least 3 fused rings, such as: anthracene, substituted anthracene, benzanthracene, phenanthrene, substituted phenanthrene, naphthacene, substituted naphthacene, pentacene, substituted pentacene, fluorescein and the like. Typical substitutes for all of these are phenyl, lower alkyl, chlorine, bromine, cyano, alkoxy ($C_1$–$C_{16}$), and other like substituents which do not interfere with the light-generating reaction contemplated herein.

Numerous other fluorescent compounds having the properties given hereinabove are well known in the art. Many of these are fully described in "Fluorescence and Phosphoresence", by Peter Pringsheim, Interscience Publishers, Inc., New York, N.Y., 1949. While only typical fluorescent compounds are listed hereinabove, the person skilled in the art is fully aware of the fact that this invention is not so restricted and that numerous other fluorescent compounds having similar properties are contemplated for use herein.

It has been found that the molar (moles per liter of diluent) concentrations of the major components of the novel composition herein described may vary considerably. The acridine acid halide or anhydride compound concentration is in the molar concentration range of at least about $10^{-7}$ upward, preferably in the range of about $10^{-5}$ to about 1 molar; the additional fluorescent compound when employed, is present in the range from about $10^{-5}$ to 5, preferably $10^{-3}$ to 1; and the water preferably should be present in an amount sufficient to initiate the reaction, and the water or other diluent must be present in a sufficient amount to form a solution of the reactants involved in the chemiluminescent reaction. There is no known maximum limit on the concentration of the acridine acid halide or anhydride.

The chemiluminescent composition of this invention which obtains chemiluminescent light emission upon the admixing of the ingredients of the composition, may be admixed in a single stage of admixing or n a sequence of steps of admixing the separate ingredients. Accordingly, alternative compositions may be prepared which may be stored over a period of time and which may be admixed with the final ingredient at a time when the chemiluminescent lighting is desired. For example, one such composition would be a composition which includes the fluorescer-producing acid halide compound, but which does not include a peroxide composition and does not include a diluent. Another example would be a composition which includes the acid halide or anhydride compound, a fluorescent compound, and a peroxide composition, but which does not include a diluent. An alternative composition would be a composition which includes the acid halide or anhydride compound, a fluorescent compound, and water-bound compound such as a conventional hydrate such as magnesium sulfate hydrate, but which does not include a peroxide compound. Another alternative composition would be a composition which includes all of the essential components except the fluorescent compound. Another alternative composition would be a composition which includes the fluorescent compound, a peroxide and water, but which does not include the acid halide or anhydride compound. Obviously the preferred compositions which would be less than all necesary components to produce a chemiluminescent light, would be a composition which would be substantially stable to a practical degree over an extended period of time; otherwise there would be no real advantage in forming a chemiluminescent reactant to be employed in a subsequent chemiluminescent reaction.

The order of addition of a diluent and of a peroxide compound is not critical, except where the diluent includes water. When water is added to the acridine 9-carboxyacid halide or anhydride, or a salt thereof, the water slowly reacts to produce a compound which will not react with a peroxide compound and which will not produce chemiluminescent light. Therefore, if water is added first to the acridine compound, the peroxide should be added reasonably soon thereafter to obtain optimum results. Therefore, it is preferred to add the peroxide (1) before or (2) substantially simultaneously with the addition of water. Also, a reactant combination of the acridine compound with a diluent other than water, or with a peroxide, would be preferred to a reactant combination of the acridine and water. However, the presence of a hydrate in combination would be desirable.

The rate of light emission is influenced by the pH and the rate is depressed as the reaction mixture becomes more acidic and is accelerated in basic media. However, little variation is observed in the ambent pH range of common water sources.

The wavelength of the light emitted by the composition of this invention will vary, depending upon the particular acid halide or anhydride compound which is employed in the reaction mixture.

The wavelength of light emitted varies with the substituents in positions 1 through 8 and 10 of the acridine reactant.

Temperature is not a critical factor but excellent results have been obtained at ambient temperature.

The mechanism of applicants' invention, i.e., the reactions and the intermediate products, is typically represented by the following equations:

Starting compound:

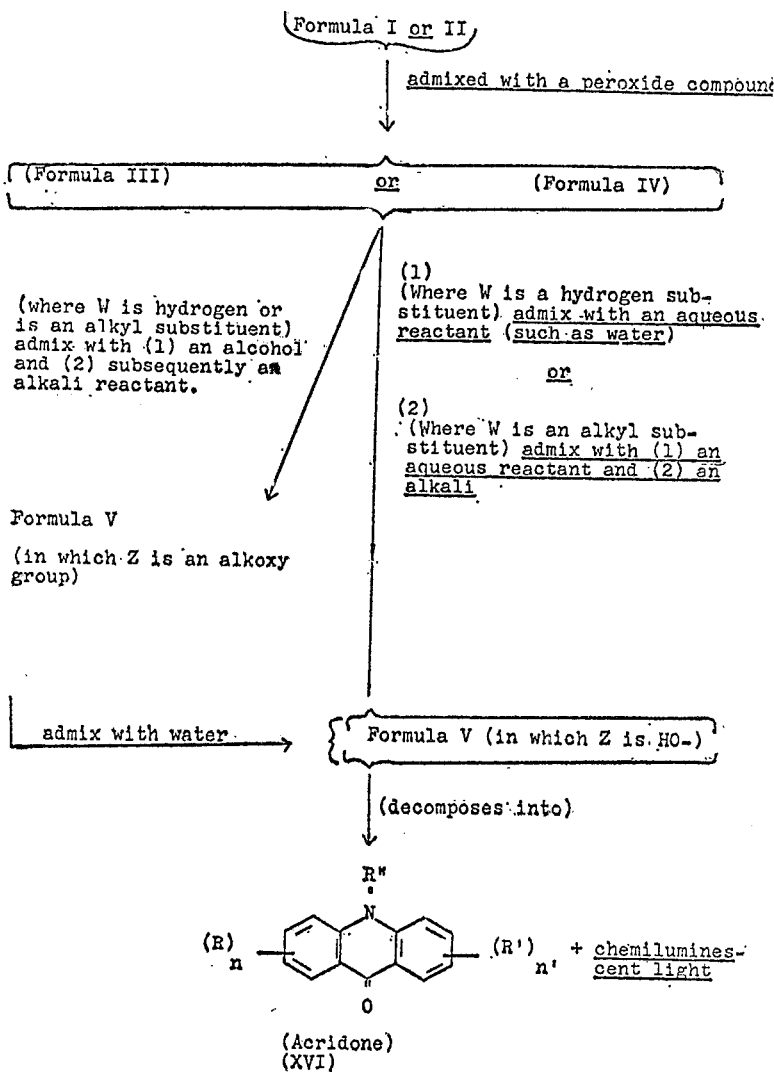

When in Formula III and IV W is a hydrogen substituent, water reacts to produce Formula V.

When in Formula III and IV W is a straight-chained or branch alkyl, or is a cycloalkyl, substituted or unsubstituted, the aqueous reactant must include an alkali in an amount sufficient to obtain a pH above about pH 7, in order to produce Formula V and in order to produce chemiluminescent light. Any alkali is suitable, such as calcium carbonate or hydroxide, sodium carbonate or hydroxide, potassium carbonate or hydroxide, ammonium hydroxide, tetrabutylammonium hydroxide, and the like.

The following examples are intended to illustrate embodiments of the present invention.

EXAMPLE 1

One gram of 9-chlorocarbonylacridine hydrochloride is dissolved in 20 ml. of pyridine. When one-half of this

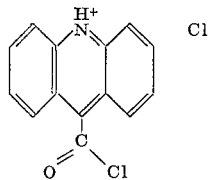

solution is added to 10 ml. of 30% aqueous hydrogen peroxide, a steady bright blue light emission is observed. When 10 ml. of 30% aqueous hydrogen peroxide is added to the remainder of the pyridine solution a more intense long-lived blue light emission is observed.

EXAMPLE 2

When 10 mg. of 9-chlorocarbonylacridinehydrochloride is dissolved in 5 ml. of 30% aqueous hydrogen peroxide and the resultant solution diluted with 500 ml. of water a sustained deep blue emission is observed.

Under the typical conditions illustrated in Example 2, chemiluminescence is obtained (except that the color of the light varies with different substituents) when the following acridines and acridinium salts are employed:
9 - chlorocarbonyl - N - ethylacridinium chloride; 9-bromocarbonyl N - dodecylacridinium bromide; 3,6-dimethoxy - 9 - chlorocarbonylacridine; 3,6 - diethyl-9-chlorocarbonyl - N - (2 - propyl)acridinium tetrafluoroborate; 4 - chloro - 9 - chlorocarbonyl-N-phenylacridinium perchlorate; 7 - chlorocarbonyl - 12 - methylbenz[c]acridinium chloride; 14 - chlorocarbonyl - 7 - ethyldibenz[a,h]acridinium chloride; 2 - acetamido - 6 - chloro - 9-chlorocarbonylacridine.

EXAMPLE 3

When 100 mg. of 9-chlorocarbonyl-N-methylacridinium chloride is dissolved in 50 ml. of a 5 M solution of anhydrous hydrogen peroxide in tetrahydrofuran (prepared from 90% aqueous hydrogen peroxide, tetrahydrofuran and magnesium sulfate) a blue-green light emission is observed lasting from 60 to 90 minutes.

EXAMPLE 4

When 100 mg. of 9-chlorocarbonyl-N-methylacridinium chloride is dissolved in 10 ml. of 30% aqueous hydrogen peroxide and the resultant solution diluted with 3 l. of water, a bright long-lasting blue light emission is observed. If, after dilution, 10 ml. of 0.5 N aqueous disodium fluorescein is added, a yellow light emission is observed of shorter lifetime.

EXAMPLE 5

When 100 mg. of 9-chlorocarbonyl-N-methylacridinium chloride is dissolved in 10 ml. of 30% aqueous hydrogen peroxide and then diluted with 25 ml. of 0.1 N aqueous hydrochloric acid, no light emission is observed. The addition of 25 ml. of 0.1 N aqueous sodium hydroxide solution to neutralize the acid causes an intense bright blue-green light emission.

EXAMPLE 6

Twenty milligrams of 9 - chlorocarbonyl-N-methylacridinium chloride is treated with 5 ml. of t-butyl hydroperoxide and the mixture is allowed to stand for 2 min. The addition of 50 ml. of water has no effect, but when followed by the addition of 5 ml. 1 N aqueous sodium hydroxide solution a brief blue light emission is observed. The further addition of water causes a steady emission and the dropwise addition of 50% aqueous sodium hydroxide causes a substantial increase in the intensity of the emission.

EXAMPLE 7

9 - chlorocarbonyl - N - methylacridinium chloride (20 mg.) is dissolved in 10 ml. of a 5 M solution of hydrogen peroxide in dimethylphthalate and 10 ml. of water is added. A weak blue-green light emission is observed. On shaking the mixture a more intense bright blue long-lasting light emission is observed.

EXAMPLE 8

Twenty milligrams each, of 9-chlorocarbonyl-N-methylacridinium chloride and sodium pyrophosphate peroxide, are combined to form a stable solid mixture. Addition of this solid to 500 ml. of water produces a brilliant blue light emission.

The use of sodium perborate instead of sodium pyrophosphate peroxide gives a similar result.

EXAMPLE 9

9 - chlorocarbonyl - N - methylacridinium chloride (20 mg.) is suspended in 20 ml. of tetrahydrofuran and 20 mg. of perlauric acid is added. No light emission is observed. The addition of 60 ml. of water dissolves the solids but fails to produce light. The further addition of 1 drop of 50% aqueous hydroxide causes a bright blue light emission.

EXAMPLE 10

9 - chlorocarbonyl - N - methylacridinium chloride (100 mg.) is dissolved in 10 ml. of 30% aqueous hydrogen peroxide and the resultant solution is diluted with 100 ml. of 10% aqueous sodium hydroxide solution. A very bright blue light emission is observed.

Under the typical conditions illustrated in Example 10, chemiluminescence is obtained when the following acridine and acridinium salts are employed:
9 - acetoxycarbonylacridine; 9 - benzoyloxycarbonyl-N - (2 - methoxypropyl)acridinium acetate.

EXAMPLE 11

A solution of 200 mg. of 9-chlorocarbonyl-N-methylacridinium chloride in 20 ml. of a solution of anhydrous 5 M hydrogen peroxide in dimethylphthalate is allowed to stand for 20 min. to complete the formation of 9-carboperoxy-N-methylacridinium chloride (Formula IV). To one-half of the solution, 10 ml. of anhydrous methanol is added and the mixture allowed to stand for 20 min. to complete the formation of 9-carboperoxy-9-methoxy-N-methylacridan (of Formula V). On dilution of this latter solution with a large excess of water and shaking, a long-lasting intense blue-green light (Formula V, Z=OH) resulting from decomposition of 9-carboperoxy-9-hydroxy-10-methylacridan emission is observed. A similar emission is observed when the second half of the original solution (not containing methanol) is similarly diluted with water, in which case 9-carboperoxy-9-hydroxy-10-methylacridan is formed directly.

The acridine reactants required as starting materials to produce the chemiluminescent-compounds of this invention may typically be prepared by methods described in R. M. Acheson, R. E. Orgel, Acridines, Interscience Publishers, Inc., New York, 1956.

It should be noted that the term "fluorescent compound" as employed in the above disclosure means (1) a compound which is a fluorescer and/or (2) a compound which upon reaction produces a fluorescent compound.

We claim:
1. An acridine 9-carboxylic acid compound of the formula:

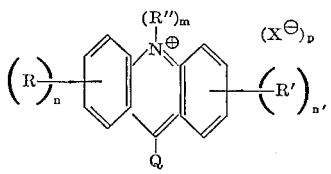

in which:
(A) Q is a radical selected from the group consisting of:

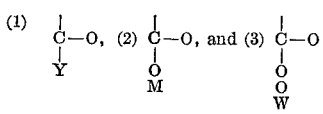

wherein Y is a halogen; M is selected from the group consisting of hydrogen and lower alkyl;
(B) W is selected from the group consisting of hydrogen and lower alkyl;
(C) R and R' are selected from the group consisting of lower straight chain alkyl, and lower alkoxy;
(D) A'' is selected from the group consisting of alkyl of 1 to 12 carbon atoms and phenyl;
(E) X is an anion;
(F) M is 0 to 1; $n$ and $n'$ are 0 to 4; and $p$ is 0 to 1.

2. 9-chlorocarbonyl-N-methylacridinium chloride.
3. 9-carbomethoxy-N-methylacridinium methosulfate.
4. 9-carboxy-N-methylacridinium chloride.

References Cited
UNITED STATES PATENTS

| | | | |
|---|---|---|---|
| 3,033,866 | 5/1962 | Saggiomo | 260—279 |
| 3,158,608 | 11/1964 | Raue | 260—279 X |
| 3,213,440 | 10/1965 | Gesteland | 252—188.3 |
| 3,236,850 | 2/1966 | Oswald | 260—279 X |
| 3,400,080 | 9/1968 | Mandling | 252—188.3 |

DONALD G. DAUS, Primary Examiner

U.S. Cl. X.R.

252—188.3; 260—309, 502, 668, 694